Oct. 18, 1927.

F. TYSON 1,645,782

FREEZING MECHANISM

Filed Feb. 7, 1923

INVENTOR:
Frank Tyson
BY
ATTORNEY.

Oct. 18, 1927.  
F. TYSON  
1,645,782  
FREEZING MECHANISM  
Filed Feb. 7, 1923   3 Sheets-Sheet 2
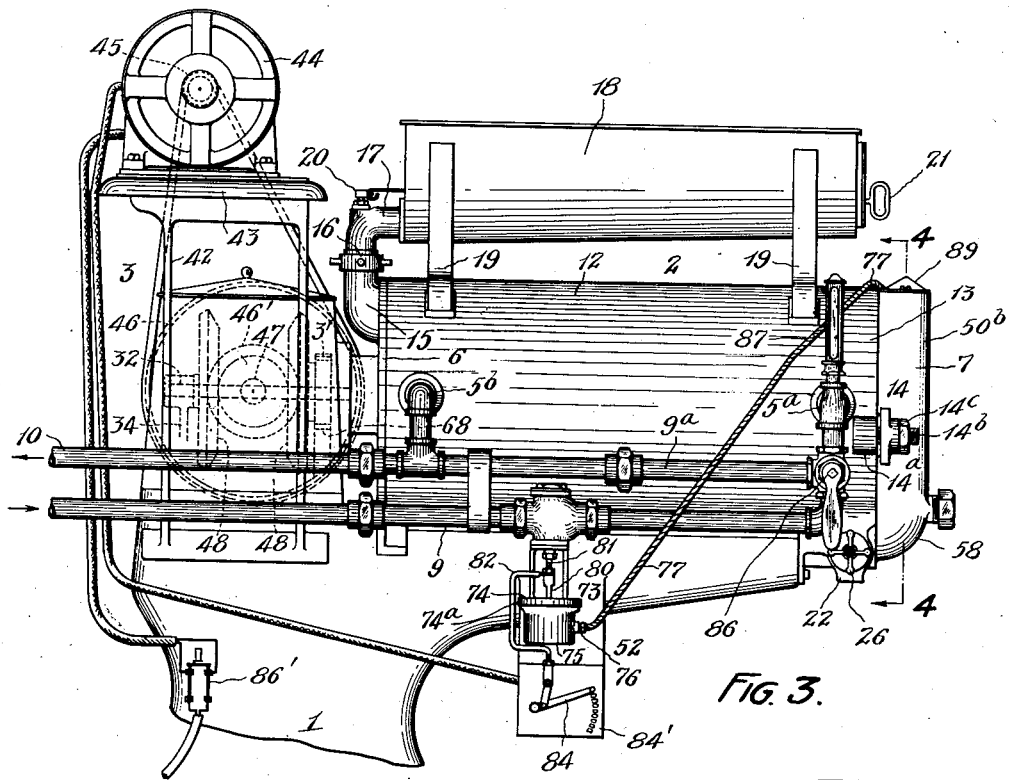
Fig. 3.
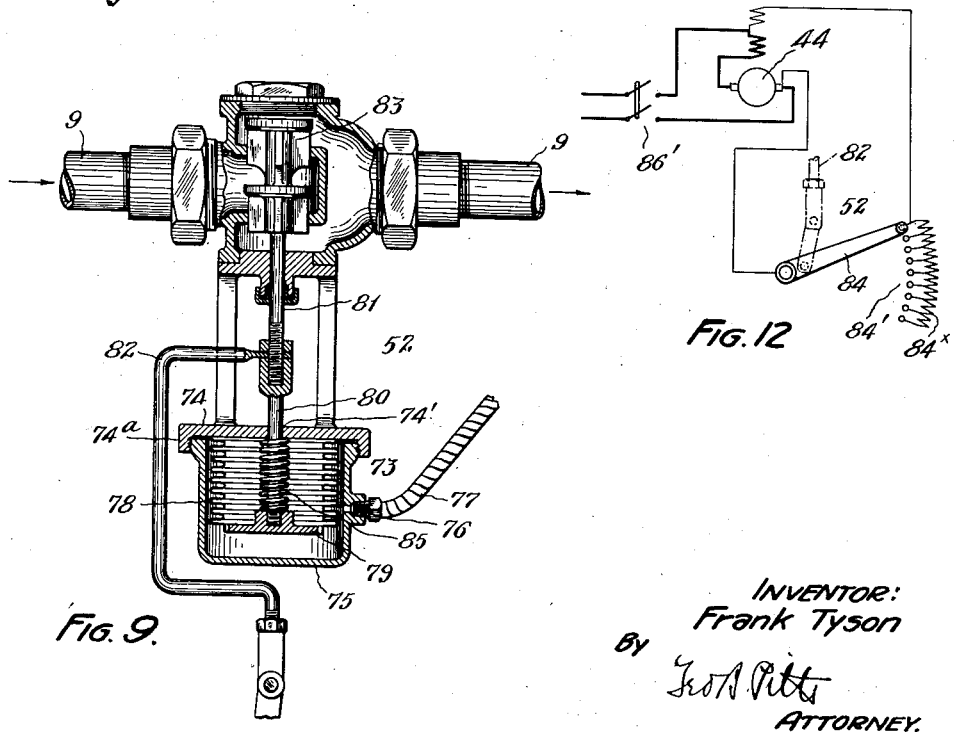
Fig. 9.
Fig. 12.
INVENTOR:  
Frank Tyson  
By  
ATTORNEY.

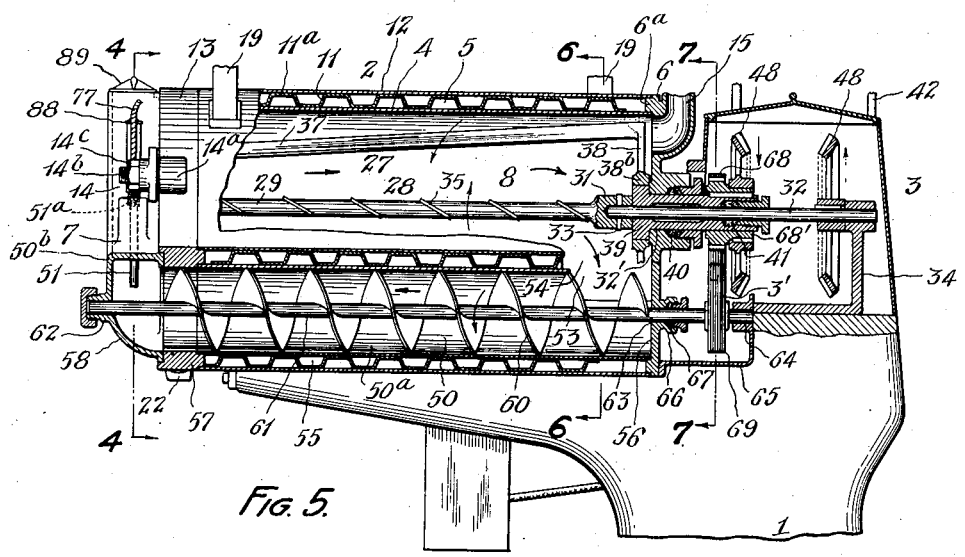
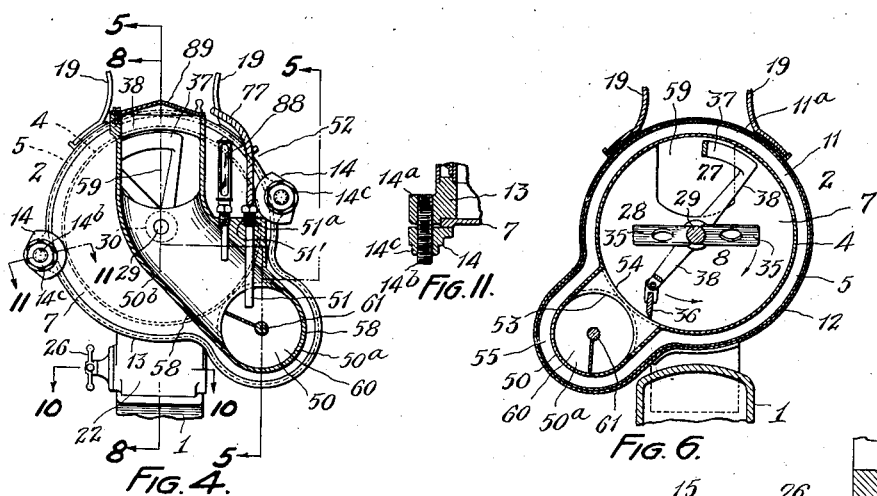
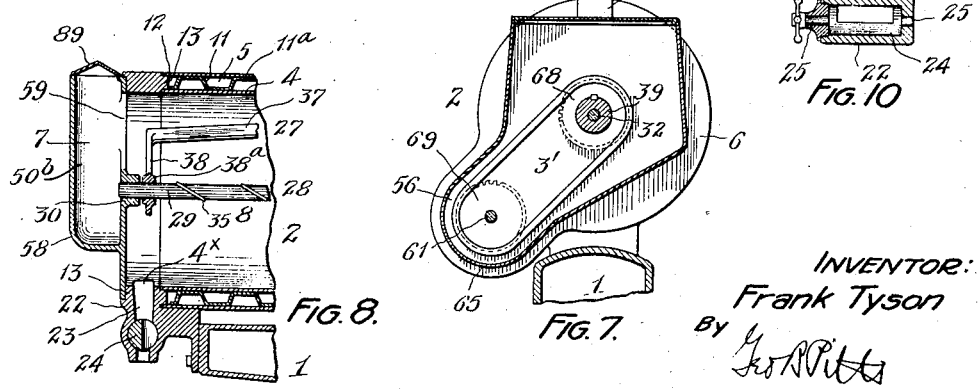

Patented Oct. 18, 1927.

1,645,782

UNITED STATES PATENT OFFICE.

FRANK TYSON, OF CANTON, OHIO.

FREEZING MECHANISM.

Application filed February 7, 1923. Serial No. 617,469.

This invention relates to a freezing mechanism, more particularly a mechanism for making materials, such as ice cream, ices and like products.

One object of the invention is to provide, in a freezing mechanism, means, dependent on the temperature of the material as it is being treated or operated upon, to control the speed of the driving means, whereby the speed of the treating means, for example, the agitating and scraping element or elements, varies as the temperature of the material changes.

Another object of the invention is to provide, in a material treating mechanism, means, dependent on the temperature of the material as it is being treated or operated upon, for controlling the supply of a temperature changing medium to the jacket of the material container, whereby the application of the medium to the wall of the container varies as the temperature of the material changes.

Another object of the invention is to provide an improved freezing mechanism wherein the speed of rotation of the elements, which act on the material within the freezing cylinder or the supply of the cooling medium to the jacket of the freezing cylinder, or both, is or are automatically controlled to insure uniformity of treatment of the successive batches of the material, whereby the same quality and character of frozen material results.

Another object of the invention is to provide an improved material treating mechanism having a conduit through which portions of the material flow as the treating operation continues, whereby its temperature may be (1) readily taken to indicate to the operator the condition of the material and (2) utilized to control the treating operation.

Another object of the invention is to provide an improved freezing mechanism in which a conduit connected to the front and rear ends of the freezing cylinder permits the material to flow from one end to the other around the agitating or scraping elements, whereby all portions of the material will be caused to flow through the freezing cylinder and be acted upon by the agitating and scraping elements therein.

Other objects of the invention will be apparent to those skilled in the art to which my invention relates from the following description, taken in connection with the accompanying drawings, wherein;

Fig. 3 is a fragmentary side view looking at the opposite side from that shown in Fig. 1.

Fig. 4 is a section on the line 4—4 of Figs. 1, 3 and 5.

Fig. 5 is a section on the line 5—5 of Fig. 4.

Fig. 6 is a section on the line 6—6 of Fig. 5.

Fig. 7 is a section on the line 7—7 of Fig. 5.

Fig. 8 is a section on the line 8—8 of Fig. 4.

Fig. 9 is a fragmentary section showing in detail the controlling means for the valve in the temperature changing medium supply pipe and the lever for the rheostat in the circuit for the driving motor.

Fig. 10 is a section on the line 10—10 of Fig. 4.

Fig. 11 is a detail sectional view.

Fig. 12 is an electrical wiring diagram of driving motor and control apparatus.

Figures 1, 2:
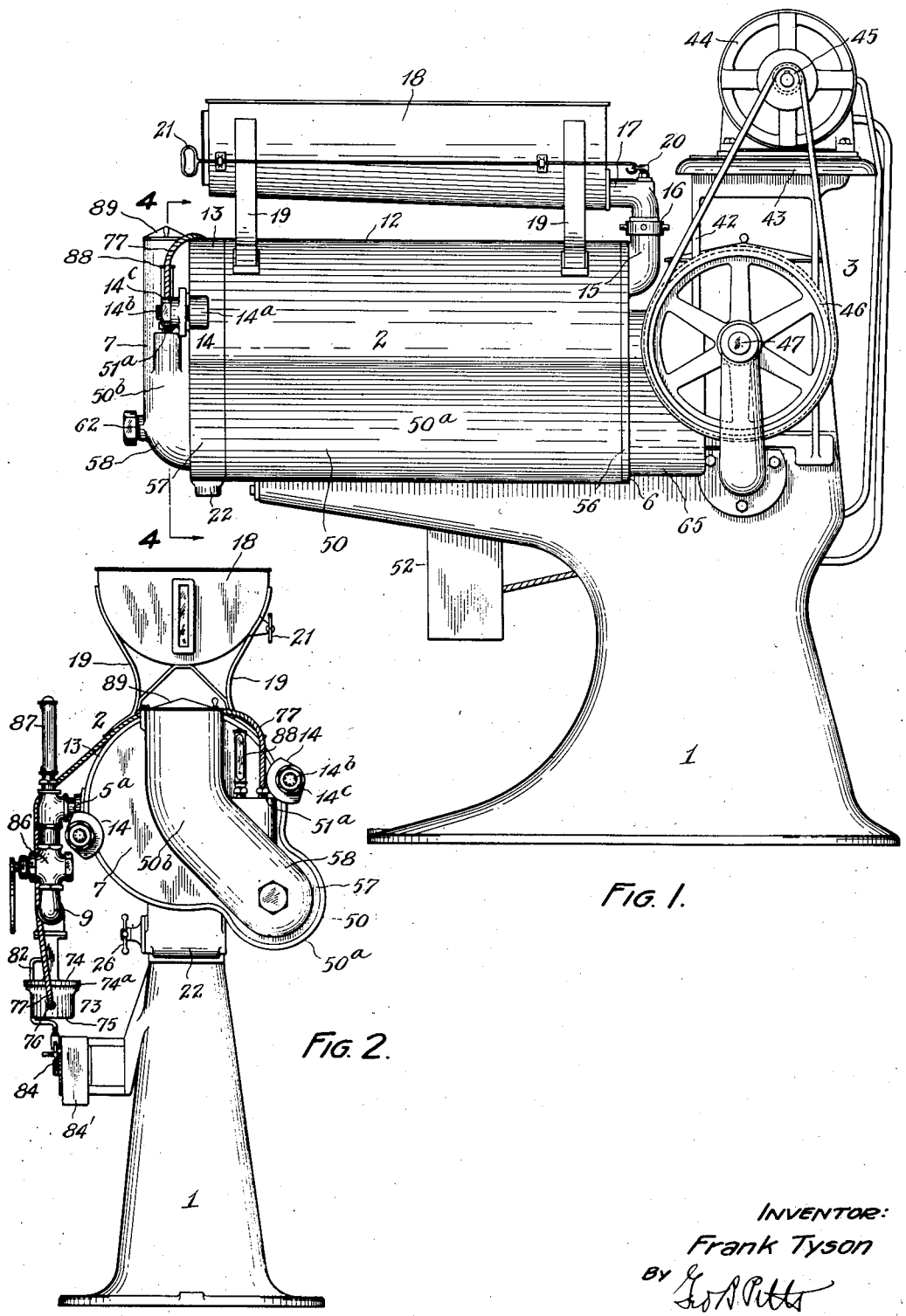
Fig. 1 is a side elevation of a material treating mechanism embodying my invention.
Fig. 2 is a view of the front end of the mechanism.

In the drawings, 1 indicates a base or standard adapted to rest in the floor or other support, and fashioned to support in a rigid manner the freezing cylinder, indicated as an entirety at 2, and driving mechanism, indicated as an entirety at 3. If desired, the freezing cylinder 2 may be supported in the manner disclosed in Letters Patent No. 990,495 to Leroy S. Pfouts, dated April 25, 1911.

The cylinder 2 preferably comprises an inner cylinder 4, which serves as the container for the material, a jacket 5, a rear head 6, a front head 7, and means indicated at 8, within the inner cylinder for acting on the material to be treated or frozen. The jacket 5 is constructed to form a circuitous passage or conduit around the inner cylinder 4, from end to end thereof, for the temperature changing medium (brine being preferably used where the mechanism is to be used for freezing purposes), to effect change in temperature of the material therewithin, such passage or conduit having an inlet $5^a$ and an outlet $5^b$, the former being connected with a supply pipe 9 and the latter being connected with a return or discharge pipe 10. The jacket 5 preferably comprises one or more metal sheets 11, having corrugations 11$^a$, preferably secured to the outer surface of the inner cylinder 4 in the manner disclosed in Letters Patent No. 878,225 to John C. Miller, dated February 4, 1908, and a casing 12 surrounding the corrugated sheets 11. At their rear ends the cylinder 4 and casing 12 respectively engage the inner and outer walls of a circular rib 6$^a$ provided on the inner face of the rear head 6, the rib serving to space the cylinder and casing ends in concentric relation and being secured thereto in a manner to prevent leakage from the inner cylinder through the head. 13 indicates a ring member fitting between and secured to the opposite or front ends of the inner cylinder 4 and casing 12. The outer surface of the ring member 13 is provided with (1) a seat with which the rim of the front head 7 engages and (2) sets of devices 14 for clamping the head 7 against its seat. Each set of devices 14 preferably comprises a lug 14$^a$ extending laterally from the ring 13 and formed with a screw threaded opening to receive and support a screw threaded stud 14$^b$ and a nut 14$^c$ fitting the stud 14$^b$ and arranged to be tightened thereon against the adjacent edge of the head 7—see Figs. 1, 3, 4 and 5, but it will be understood that other forms of clamping devices, for example, such as shown in Letters Patent No. 945,570 to John C. Miller, may be used.

The freezing cylinder may be provided with one or more inlets and a valved discharge opening 4$^x$, whereby the inner cylinder 4, may be filled with a batch or charge of material and emptied at the end of the treating operation. By preference the inlet for the material, such as cream and flavoring material, comprises a duct 15 leading to an opening formed in the rear head 6. The duct 15 may be connected by a suitable coupling 16 with a discharge pipe 17 preferably leading from a batch holding tank 18. The tank 18 may be supported on the freezing cylinder by suitable legs 19. The pipe 17 may be provided with a valve 20, the stem of which has connected to it a handle 21, preferably extending to a point adjacent to the front end of the freezing cylinder. The valved discharge opening 4$^x$ is preferably formed in the ring 13 and it preferably has associated with it a casing 22 integrally connected with said ring and formed with an elongated passage 23 leading from the discharge opening 4$^x$. The walls of the passage 23 are cut away to accommodate a valve 24, preferably of the rotary type, having trunnions 25, fitting openings in the end walls of the passage 23, whereby it may be oscillated to open or close the passage; one of the trunnions 25 being extended to provide a connection for a handle 26. The means 8 within the inner cylinder 4 for acting on the material therein, is preferably constructed and arranged to (1) agitate it, (2) scrape from the inner surface of the inner cylinder the films of material adhering thereto as the freezing continues, and (3) eject the material from the cylinder at the end of the freezing operation, whereby the material will be subjected to treatment to condition it into uniform consistency while being frozen in a relatively short period of time. The treating means preferably comprise outer and inner rotating members 27 and 28, respectively, the outer member operating near the outer portion of the cylinder 4 and the inner member operating in or about its central portion. The inner member 28 comprises a shaft 29, the front end of which is rotatably supported in a boss 30 formed in the front head 7. The rear end of the shaft 29 is formed with a socket 31 to receive the end of a driven shaft 32, to which the socket is fixed by a pin or key 33. The shaft 32 extends through an axially arranged opening 32' formed in the cylinder head 6 and is supported in a suitable bearing provided on a standard 34. The shaft 29 is provided with a plurality of spaced blades or paddles 35, preferably disposed at an angle to an inclined plane cutting the axis of the shaft 29 so as to effect movement or flow of the material toward one end of the cylinder. By preference the shaft 29 is driven anti-clockwise (when looking at the front of the cylinder—see Fig. 2) and the blades 35 are arranged to move the material toward the rear end of the cylinder 4. The outer member comprises one or more scraping devices 36 (one only being shown) and an ejecting device 37 (one only being shown) suitably supported at their opposite ends on spiders 38. The hub 38$^a$ (see Fig. 8) for the spider at the front end of the outer rotating devices 36, 37, is loosely mounted on the shaft 29. The hub 38$^b$ for the spider at the rear end of the devices 36, 37, is connected to a sleeve 39 which extends through the opening 32' and rotatably fits the shaft 32. The rear face of the head 6 is preferably provided with a wall surrounding the opening 32', whereby provision may be made for a suitable gland 40, around the sleeve shaft 39. Likewise, to prevent leakage between the sleeve shaft 39 and shaft 29, a gland 41 is provided at the outer end of the former. The ejecting device 37 is shown herein as a spirally twisted bar or a bar that is inclined to the axis of rotation and serves to propel the material toward the front end of the cylinder 4 and to effect its ejection through the discharge opening or passage 23 when the valve 24 therefor is open, but it will be obvious that other forms of ejecting devices may be substituted therefor.

Of the driving mechanism 3, 42 indicates a suitable support, having a base plate 43, carried at the rear end of the base or standard 1. 44 indicates a motor, preferably a variable speed electric motor, fixed to the base plate 43, the armature shaft of the motor carrying a sprocket 45 over which a drive chain runs to drive a sprocket 46. The sprocket 46 is fixed to a shaft 47, mounted in suitable bearings and drives a main gear 46′ which meshes with gears 48, 48, fixed to the shaft 32 and sleeve 39, respectively, whereby the latter are rotated in opposite directions.

50 indicates a conduit connected at its opposite ends to spaced openings formed in the freezing cylinder 2 to permit the flow of the material in the cylinder 4 from one portion thereof to another portion, whereby the entire body of the material may be moved relative to an element 51 (see Figs. 4 and 5) of a mechanism, indicated as an entirety at 52, adapted to control the freezing operations in the manner to be later set forth.

The conduit 50 preferably comprises a main section 50ª and a branch section 50ᵇ. The main section 50ª preferably extends parallel to the cylinder 2, at one side and from end to end thereof and is connected with the interior of the cylinder 4 near its rear end by an opening 53 formed in the side wall thereof, which opening communicates with an opening 54 formed in the adjacent portion of the cylinder 4. The conduit section 50ª is preferably of cylindrical shape and its wall is jacketed as shown at 55, the latter being preferably incorporated with the jacket 5 for the cylinder 2; that is, the jacket 5 is extended around the conduit wall (see Fig. 6) so that the cooling medium flows around both the inner cylinder 4 and the conduit section 50ª. The rear end of the conduit is closed by a plate 56, preferably formed integrally with the rear head 6. The plate 56 is preferably provided with an annular rib with which the end wall of the cylinder or conduit 50ª engages to form a liquid tight joint. 57 indicates a ring member preferably formed integrally with the ring 13 and arranged to be secured to the front end of the main conduit section 50ª, for example, in a manner similar to that shown for connecting the ring 13 and cylinder 2 together. 58 indicates a wall, preferably formed integrally with the head 7 arranged to engage the ring member 57 at its lower end. The wall 58 is shaped to cooperate with the wall of the head 7 to form the branch conduit section 50ᵇ and to provide a suitable liquid tight connection with the ring member 57, whereby the sections 50ª, 50ᵇ, are connected to form a single conduit. The section 50ᵇ leads upwardly so that its upper end communicates with or is connected to an opening 59 formed in the head 7, preferably near its upper portion, to deliver the material therethrough into the inner cylinder 4. From the foregoing description, it will be seen that the material in the cylinder 4 is moved rearwardly by the action of the blades 35, and then forced through the openings 54, 53, into conduit 50, through which it flows to the front end of the cylinder to be acted upon by the treating devices 36 and 37 and to again be forced through the conduit 50, these operations continuing throughout the freezing operation. By arranging the inlet end of the conduit in the lower portion of the wall of the cylinder 4, it will at all times be below the level of the material therein, although portions thereof will be moving about the upper portion of the interior of the cylinder due to the revolving action of the treating devices 35, 36 and 37. On the other hand, the outlet end for the conduit 50 is at the upper portion of the front head 7, as very little of the material rises to this height in the freezing operation, and the ejecting action of the bar or bars 37, as they traverse this portion of the cylinder wall, is not sufficient to cause a flow of the material through the opening 59 into the conduit section 50ᵇ. The inlet end of the conduit 50 may be provided with a valve to prevent the flow thereinto if for any reason it is found desirable to operate the freezer independently of the conduit through the entire freezing operation or during a portion of the time required to freeze a batch of material.

60 indicates a conveying mechanism, which may be provided in the conduit 50ª, to supplement the propelling action of the blades 35, as well as to cause the material to flow more uniformly and relatively quickly through the conduit. The conveying mechanism 60 preferably comprises a screw conveyor, extending from end to end of the conduit section 50ª. This form of conveyor is particularly advantageous since it engages with the wall of the conduit throughout its entire circumference and hence prevents clogging of the conduit or backing up of the material therein. The shaft 61 of the conveyor 60 is extended at its opposite ends, its front end being mounted in a boss or collar 62 provided on the wall 58 and its rear end extending through an opening 63 formed in the plate 56 and supported in a bearing 64 in a housing 65 enclosing the driving mechanism 3 and a driving mechanism 3′ for the shaft 61. The plate 56 is provided with an integral collar 66, surrounding the opening 63 to provide for a suitable gland 67 around the shaft 61. The driving mechanism 3′ preferably comprises a pinion 68 keyed to the sleeve shaft 39, as shown in Figs. 5 and 7, and a gear 69 keyed on the shaft 61. To permit of assembly of the pinion 68, it is provided with a hub 68′ on which the hub of the adjacent gear 48 is fixably mounted.

Of the control mechanism 52, 73 indicates a casing preferably comprising a base member 74 having a rim 74ª and a cup shaped member 75 having screw threaded connection with one side wall of the rim 74ª to form a liquid or gas tight joint therewith. At 76, the wall of the cup shaped member 75 is formed with an opening in which is connected one end of a pipe (preferably a flexible pipe) 77. The opposite end of the pipe leads to and is connected to the element 51. The element 51 preferably comprises a bulb adapted to hold a suitable liquid which vaporizes at a relatively low temperature, such as ether or a compound containing ether. I prefer to effect freezing of the material at or about a temperature of 24 degrees F. The bulb 51 extends downward into the conduit section 50ᵇ, preferably near its connection with the front end of the conduit section 50ª in the path of movement of the material from the latter, whereby the liquid in the bulb may be readily affected by changes in the temperature of the material as it is delivered by the conveying means 60 into the conduit section 50ᵇ. The bulb 51 is preferably supported in a socket 51ª, which fits and is secured in a well known way within an opening 51' formed in an offset wall provided at one side of the conduit section 50ᵇ. 78 indicates a diaphragm within the casing 73. The diaphragm preferably comprises a cylinder having annular corrugations that is expansible and compressible in the direction of its axis. The inner end of the diaphragm is secured in a well known manner to the base member 74; its outer end is secured to a cap 79, which is connected by a rod 80 to operating elements 81, 82, the former comprising a stem connected with a valve 83 in the supply 9 and the latter comprising an arm connected with the switch arm 84 of a rheostat 84' to control the supply of current to the motor 44. The rod 80 extends through an opening 74' formed in the base member 74, the walls of the opening serving as a guide for the rod. 85 indicates a spring preferably coiled around the rod 80 and bearing at its opposite ends against the inner or opposing faces of the base member 74 and cap 79, and normally tending to push the latter outwardly and hence expand the diaphragm 78 against the action or expansion due to the vaporization of the liquid in the bulb 51. The rheostat is so constructed that relatively slight movement of its switch arm will affect the supply of current to the field of the motor 44, in order that the speed thereof may be quickly changed by the operation of the control mechanism 52. The motor 44 herein illustrated by way of example is a variable speed motor using direct current and compound wound, so that its speed is increased by cutting resistance into the shunt winding in the field. Accordingly, as will be more evident from the description following, the switch arm is normally disposed at that end (hereinafter referred to as its "off" position) of the rheostat 84' at which all the resistance is cut out and moves toward the opposite end (the "on" position) to cut in the resistance to effect increase in the motor speed.

86 indicates a valve interposed in the pipe 9 near or adjacent the inlet 5ª. The valve 86 is preferably of the three-way type, so that the brine may be directed into the jacket 5, or its flow entirely cut off, or cut off from the inlet 5ª and directed through a supplemental pipe 9ª to the return pipe 10.

The operation of the mechanism may now be described: at the time of starting the material in the bulb 51 being at room temperature, it will under normal conditions be vaporized and acting to compress the diaphragm, as shown in Fig. 9; accordingly, the valve 83 will be full open and the switch arm 84 at the "off" position, as shown in Figs. 3 and 12. As the temperature of the material in the cylinder 4 drops, it will permit the vaporized material to liquefy, thereby reducing the pressure on the diaphragm 78 and allowing it to expand under the influence of the spring 85 and in turn move the rod 80 (downwardly, as shown in the drawings). The rod 80 in turn will move the valve 83 toward its seating position (cutting off the supply of brine) and the switch arm 84 toward its "on" position (cutting in resistance and increasing the speed of the motor). Likewise, when the temperature of the material rises and effects vaporization of the material in the bulb 51, and compression of the diaphragm 78, these operations of the valve 83 and switch arm 84 will be in the reversed direction to simultaneously increase the supply of brine and decrease the speed of the motor. However, in starting, as first above described, the valve 86 will be positioned to cut off the brine to the jacket 5 and the main switch 86' (see Fig. 12) for the motor circuit will be open. First, a batch of material is delivered to the batch tank 18, whereby the material may be measured. Next, the main switch 86' is closed and the valve 86 operated to admit the brine through the inlet 5ª into the jacket 5. Then the valve 17 is opened to allow the material to flow from the batch tank into the cylinder 4. The freezing of the material then commences, the treating elements or devices 35, 36 and 37 serving to agitate the material, scrape those poritons adhering to the inner surface of the cylinder 4 and to propel the material through the openings 54, 53, into the conduit section 50, through which it flows past the bulb 51 into the front end of the cylinder 4, where it is again subjected to the action of the treating elements or devices 35, 36 and 37, such flow and action being continued and repeated on all portions of the batch until the freezing operation is completed; whereupon the valve 24 will be operated to open the discharge port or opening 4ˣ and permit the ejecting of the material. As the freezing of the material continues, its temperature will gradually fall or drop. If the temperature of the material drops or falls below the vaporizing temperature of the liquid in the bulb, such liquid will liquefy, and, by reason of the reduction of the pressure incident to the liquefying of the material and expansion of the spring 85, the latter will act to expand the diaphragm 78, which in turn will operate (1) the valve 83 to decrease the supply of the cooling medium and (2) the switch arm 84 to increase the speed of the motor 44, in the manner already set forth. If the temperature of the material continues to fall, the movements of the valve 83 and switch arm 84 will automatically continue until the brine is entirely cut off and the full motor speed is attained, unless, or until, the temperature of the material flowing through the conduit rises and thus effects an increase in the pressure on the diaphragm. If the temperature of the material flowing through the conduit 50 past the bulb rises above the vaporizing temperature of the liquid in the bulb, then the vapor therein and in the pipe 77 will vaporize and hence effect an expansive force on the diaphragm, and thus effect movements of the valve 83 and switch arm 84 in the opposite direction, respectively.

From the foregoing description it will be seen that there is an operative relation between the supply of the cooling medium or brine and the speed of rotation of the motor 44 or the elements driven thereby, so that when the temperature of the material falls, which takes place as the material freezes, and hence becomes more viscous, the speed of the motor is increased accordingly and the supply of brine is decreased; on the other hand, when, or if, the temperature of the material rises, due to the decrease in the supply of the brine and its increased agitation and beating, the speed of rotation of the motor is decreased and the supply of brine is increased, in proportion to the rise in temperature. Accordingly, it will be seen that the speed of rotation of the material treating elements and the supply of brine will be simultaneously and automatically controlled by the temperature of the material in the freezing cylinder and one will be increased and the other decreased, or vice versa, to provide proper agitation and beating of the material in proportion to its viscosity and uniformity of such operations with successive batches of material.

87 indicates a thermometer, which may be provided in the supply pipe 9, preferably in the connection thereof with the inlet 5ᵃ, whereby the operative may ascertain the temperature of the brine at any time. 88 indicates a thermometer supported in the offset wall of the conduit section 50ᵇ, so that its bulb end will project into the path of the material flowing therethrough, whereby the operative may determine the temperature of the material from time to time. 89 indicates a plate arranged to close the upper end of the conduit section 50ᵇ. The plate 89 is pivoted at one end to the wall 58 so that it can be positioned to permit (1) inspection of the interior of the cylinder 4 through the opening 59, thereby enabling the operative to examine the material during the freezing operation, and (2) introduction of flavoring materials, such as fruits, chocolate, etc., into the material for mixing therewith at the desired time previous to the emptying of the cylinder.

To those skilled in the art of making mechanisms of the class described, many alterations in construction and widely differing embodiments and applications of the invention will suggest themselves without departing from the spirit and scope thereof. My disclosures and the description herein are purely illustrative and are not intended to be in any sense limiting.

What I claim is:

1. In a freezing mechanism, the combination of a freezing chamber comprising a cylinder having heads to close its opposite ends, a separate chamber having an inlet and an outlet connected at spaced points with said freezing chamber and agitating mechanism within the cylinder so arranged as to agitate the material therein and discharge the material through said inlet into said separate chamber whereby the material flows into and through said chamber and back into said cylinder.

2. In a freezing mechanism, the combination of a freezing cylinder having an inlet port and a discharge port, a chamber, connections between the opposite ends of said chamber and said cylinder at spaced points thereof, mechanism within said cylinder for agitating the material therein and discharging it through one of said connections into said chamber, whereby the material flows into and through said chamber and back into said cylinder, and means in said chamber for causing a flow of the material therethrough.

3. In a freezing mechanism, the combination of a freezing cylinder having an inlet port and a valved discharge port, means for refrigerating the wall of said freezing cylinder, means within said cylinder for agitating the material therein, and mechanism arranged to be acted upon by the temperature of the material being agitated in said cylinder for controlling the operation of one of said means.

4. In a freezing mechanism, the combination of a freezing cylinder having an inlet port and a valved discharge port, means for refrigerating the wall of said freezing cylinder, means within said cylinder for agitating the material therein, and mechanism arranged to be acted upon by the temperature of the material being agitated in said cylinder for controlling said refrigerating means and said agitating means.

5. In a freezing mechanism, the combination of a freezing cylinder having an inlet port and a valved discharge port, a refrigerating jacket surrounding said cylinder, a valved source of supply connected with said jacket, means within the cylinder for agitating the material therein, and mechanism associated with said cylinder and arranged to be actuated by the rise and fall of the temperature of the material therein for controlling the valve in said source of supply.

6. In apparatus of the class described, the combination of a cylinder having an inlet port and a valved discharge port arranged to receive a batch of material to be treated, means surrounding said cylinder for changing the temperature of the material during its treatment, means within said cylinder for treating said material, mechanism for driving said treating means, and means connected with said driving mechanism arranged to be affected by the rise and fall of the temperature of the material in said cylinder for controlling the operation of said driving mechanism.

7. In apparatus of the class described, the combination of a cylinder having an inlet port and a valved discharge port arranged to receive a batch of material to be treated, a conduit connected at its opposite ends at spaced points in said cylinder whereby the material therein may flow from one portion of said cylinder through said conduit into another portion thereof, means for changing the temperature of the material while in said cylinder, means for agitating the material in said cylinder, and mechanism having an element extending into said conduit whereby it is acted upon by the temperature of the material flowing therethrough and connected with one of said means for controlling its operation.

8. In apparatus of the class described, the combination of a freezing cylinder having heads at its opposite ends and an inlet port and a valved discharge port, a chamber associated with said cylinder and connected at one end to the adjacent end of said cylinder to receive material therefrom and connected at its opposite end to the other end of said cylinder whereby the material flows back into the latter, means for changing the temperature of the material in said cylinder while being treated therein, means for treating the material in said cylinder and mechanism connected with said temperature changing means and said treating means arranged to be actuated by the rise and fall of the temperature of the material as it flows from said chamber into said cylinder for controlling said temperature changing means and said treating means.

9. In a freezing mechanism, the combination of a freezing cylinder having an inlet port and a discharge port, a chamber associated with said cylinder and connected thereto at spaced points, mechanism within said cylinder for agitating the material therein and discharging it through one of said connections into said chamber, whereby the material flows into and through said chamber back into said cylinder, means in said chamber for causing a flow of the material therethrough, said flow causing means comprising a screw conveyor fitting the wall of said chamber.

10. In apparatus of the class described, the combination of a cylinder for holding a batch of material having an inlet port and a valved outlet port, means surrounding said cylinder and acting through the wall thereof for changing the temperature of the material in said cylinder, means within said cylinder for agitating the material, and mechanism arranged to be acted upon by the temperature of the material while being agitated in said cylinder for controlling the operation of one of said means.

11. In apparatus of the class described, the combination of a cylinder for holding a batch of material having an inlet port and a valved outlet port, means surrounding said cylinder and acting through the wall thereof for changing the temperature of the material in said cylinder, means within said cylinder for agitating the material, and mechanism arranged to be acted upon by the temperature of the material while being agitated in said cylinder for simultaneously controlling the operation of said temperature changing means and said agitating means.

12. In apparatus of the class described, the combination of a cylinder for holding a batch of material having an inlet port and a valved outlet port, means surrounding said cylinder and adapted to contain a refrigerant acting through the wall of the cylinder for changing the temperature of the material in said cylinder, a chamber connected at spaced portions with said material holding cylinder, oppositely rotating elements within said cylinder for agitating the material, means for rotating the several elements, one of said elements operating to move the material toward one end of said cylinder, whereby the material is discharged into said chamber and the other element operating, when the valved port is opened to discharge the material therethrough.

13. In appatatus of the class described, the combination of a cylinder for holding a batch of material having an inlet port and a valved outlet port, means surrounding said cylinder and adapted to contain a refrigerant acting through the wall of said cylinder for changing the temperature of the material in said cylinder, a chamber connected at spaced portions with said material holding cylinder, oppositely rotating elements within said cylinder for agitating the material, means for rotating the several elements, one of said elements operating to move the material toward the rear end of said cylinder to discharge the material into one end of said chamber and the other element operating to move the material toward the front end of said cylinder, whereby the material is discharged through said valved discharge port when the latter is open.

14. In apparatus of the class described, the combination of a cylinder for holding a batch of material having an inlet port and a valved outlet port, means surrounding said cylinder and adapted to contain a refrigerant acting through the wall of said cylinder for changing the temperature of the material in said cylinder, a conduit connected to one end of said material holding cylinder near its lower portion and to the opposite end thereof near its upper portion, oppositely rotating elements within said cylinder for agitating the material, means for rotating the several elements, one of said elements operating to move the material toward that end of said cylinder to the lower portion of which said conduit is connected, whereby the material is discharged into said conduit, and the other element operating, when the valved port is opened to discharge the material therethrough.

15. In an apparatus of the class described, the combination of a freezing cylinder having an inlet port and a valved discharge port, means for refrigerating the wall of said cylinder, means within said cylinder for agitating the material therein, and mechanism arranged to be acted upon by the temperature of the material being agitated in said cylinder for controlling said refrigerating means and said agitating means in corelated relationship, whereby the operation of one said means is increased and the other decreased, or vice versa.

In testimony whereof, I have hereunto affixed my signature.

FRANK TYSON.